Oct. 28, 1941.   J. L. KOZAK   2,260,811
COUPLING MEANS FOR SCREW CONVEYERS
Filed March 19, 1941
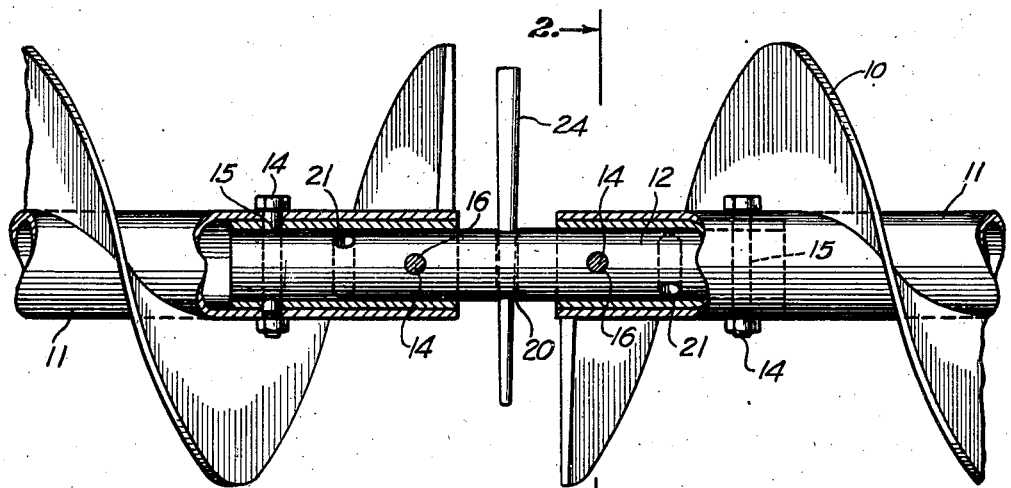
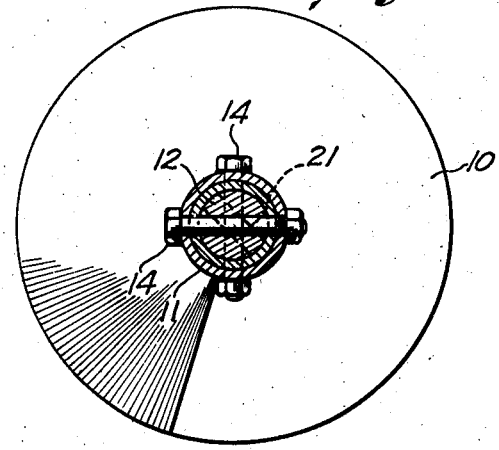
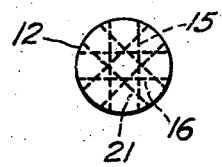
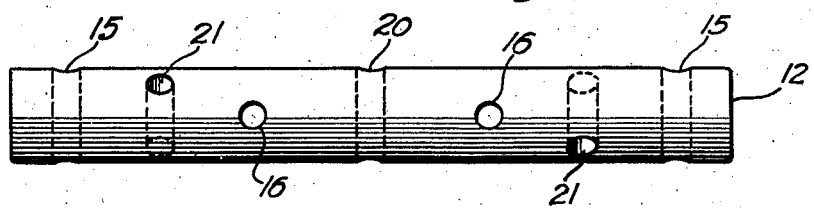
INVENTOR
J. L. Kozak
BY Chas. W. Girard
ATTORNEY Patented Oct. 28, 1941

2,260,811

UNITED STATES PATENT OFFICE 2,260,811

COUPLING MEANS FOR SCREW CONVEYERS

Joseph L. Kozak, Munster, Ind., assignor to Screw Conveyor Corporation, Hammond, Ind., a corporation of Illinois Application March 19, 1941, Serial No. 384,101

1 Claim. (Cl. 287—2)

The invention here involved has to do with screw or helical conveyer apparatus, with special reference to conveyer apparatus made up in a plurality of sections coupled together to produce a conveyer of sufficient length for the requirements of a given installation.

Conveyers of this sectional type require to be uncoupled at times, for alteration or repair of the apparatus, and at those times it is very desirable to carry out the coupling and uncoupling operations with as little labor and loss of time as possible.

Accordingly the primary object of the present invention is to provide a novel and improved coupling feature whereby this operation of coupling and uncoupling is facilitated to a very great extent and in a remarkably simple manner, and at practically no increased cost in construction.

The essential feature of improvement consists in providing means for convenient engagement with the coupling element, whereby the same may be shifted or adjusted to the necessary extent in either direction for the purposes of the repair or other operation.

With this general object in view the invention will now be described by reference to the accompanying drawing illustrating the improved coupling feature as well as indicating clearly the important advantages of same, after which what is deemed to be novel and patentable will be particularly set forth and claimed.

In the drawing—

Figure 1 is an elevation and partly sectional view illustrating the end portions of adjoining sections of a helical or screw conveyer provided with the improved coupling means connecting the ends thereof;

Figure 2 is a transverse sectional view, representing a section taken on the line 2—2 of Figure 1;

Figure 3 is an enlarged plan view of the coupling element removed from the conveyer structure; and Figure 4 is an end view of the same with dotted lines indicating the angular relation of the diametrical openings therethrough.

The particular type of coupling improvement forming the subject matter of this application relates to the type of helical or screw conveyer construction which is described in considerable detail in my co-pending application Serial No. 358,228, filed September 25, 1940. As explained in that application one of the purposes of the invention there described was to provide interchangeable screw conveyer assemblies in matched units made up of standard lengths of screw conveyer and conveyer trough sections adapted to be coupled together in continuous conveyer relation by means of combination coupling and hanger or bearing structures; the stated purpose was to secure certain important advantages in the coupling, bearing and alining functions with respect to the successively coupled units of both conveyer trough and screw conveyer sections and to enable repair and replacement operations to be carried out without undue disturbance of adjoining units of the apparatus.

Referring now to the accompanying drawing, this shows the adjoining ends of two screw conveyer sections, each made up of a ribbon or conveyer flight portion 10 and tubular shaft section 11, and these ends are adapted to be coupled together by means of a coupling member 12 of appropriate length.

The coupling member 12 is secured to the ends of the conveyer shaft sections by means of bolts 14 extending through two sets of diametrical openings 15 and 16 in the coupling member and registering with openings provided therefor in the shaft sections 11, as shown in Figures 1 and 2. These bolt openings are so spaced that the shaft sections are secured together with their adjoining ends spaced apart sufficiently to properly accommodate the combination coupling and hanger unit which is described in detail in the aforesaid pending application.

When repair or replacement of one of the conveyer units is necessary (for which purpose the said coupling and hanger unit is removed at the ends of the unit which is involved), it also becomes necessary to uncouple the ends of the corresponding conveyer sections, which is done by unbolting the couplings 12 and shifting them endwise so as to telescope them within the ends of the shafts 11 and thereby clear the ends of that conveyer section which is to be removed. With the plain, smooth portion of the coupling which forms the journal in the hanger bearing between the ends of adjoining conveyer sections, it does not always prove to be an easy or convenient matter to accomplish this endwise shifting of the coupling, and particularly to do this without some marring of its smooth finish. For overcoming this difficulty I provide the shaft coupling member with the additional diametrical openings 20 and 21 shown in the drawing. One of these openings, 20, is drilled midway between the ends of the coupling, or midway between the bolt openings 16 and at right angles to said openings 16. The other two openings 21 are drilled at right angles to each other and midway between each pair of bolt openings 15, 16.

With this construction it is apparent that on removing the combination coupling and hanger structures and also the bolts 14, the end of a suitable tool 24 such as a punch or the like may be inserted into the central opening 20; and by a combined endwise and rotary movement the coupling 12 may be pushed endwise, out of one of the shaft sections 11 and into the adjoining shaft section. The crank or turning action facilitates this endwise shifting and also serves to bring the next adjacent opening 16 around in convenient position for insertion of the tool into it. Moreover, this first endwise shifting movement has been sufficient to bring said opening 16 into exposed position, and this is true of each succeeding shifting operation, in that it produces a partial rotation and a sufficient endwise shifting of the coupling to bring the next following opening into exposed position as the tool is used in the openings 20, 16, 21 and 15 successively. The final shifting is produced by means of said tool in engagement with the opening 15, which brings that end of the coupling entirely out of its shaft section 11 and at the same time this leaves the end of the coupling out in position to start shifting it in the reverse direction as required for recoupling of the parts after completion of the repair operation.

It will therefore be apparent that the improved coupling features, as herein described, provide an efficient means for the uncoupling and recoupling operations necessary from time to time, and that the embodiment of such improvement adds no material item of expense to the cost of the construction.

What I claim therefore, and desire to secure by Letters Patent is:

In a coupling construction for sectional screw conveyer apparatus, a coupling element and bolts for coupling the conveyer sections together with the adjoining coupled ends spaced slightly apart for bearing support, said coupling element being provided with means for initially shifting the coupling for telescoping the same into either of the adjoining conveyer sections, said means comprising an opening in that part of the coupling designed for bearing support and which is exposed on removal of the bearing, thereby facilitating application of a tool into the opening for effecting said shifting action.

JOSEPH L. KOZAK.